United States Patent [19]

Radford et al.

[11] Patent Number: 5,037,594
[45] Date of Patent: Aug. 6, 1991

[54] METHOD FOR MAKING VARISTOR DISCS WITH INCREASED HIGH TEMPERATURE STABILITY

[75] Inventors: Kenneth C. Radford, North Huntingdon, Pa.; Robert G. Johnson; Andrew S. Sweetana, Jr., both of Bloomington, Ind.

[73] Assignee: Electric Power Research Institute, Inc., Palo Alto, Calif.

[21] Appl. No.: 452,130

[22] Filed: Dec. 15, 1989

[51] Int. Cl.⁵ .................. B28B 1/00; H01C 7/00; F27D 9/00
[52] U.S. Cl. .................. 264/66; 264/61; 252/518
[58] Field of Search .............. 264/61, 66; 338/20, 338/21; 252/518

[56] References Cited

U.S. PATENT DOCUMENTS 4,681,717  6/1987  Brooks et al. ............... 264/66 X
4,730,179  3/1988  Nakata et al. ............... 338/20

Primary Examiner—James Lowe
Assistant Examiner—Christopher A. Fiorilla
Attorney, Agent, or Firm—James B. Hinson

[57] ABSTRACT

A method for making a varistor disc with increased high temperature stability. The method includes the steps of formulating a mixture for the varistor disc, compacting the mixture to form a disc, sintering the disc at a first preselected temperature and cooling the disc at a predetermined linear rate. The predetermined linear rate and preselected temperature are selected to reduce nonequilibrium conditions which become "frozen-in" as said disc is cooled.

4 Claims, 2 Drawing Sheets

5,037,594

METHOD FOR MAKING VARISTOR DISCS WITH INCREASED HIGH TEMPERATURE STABILITY

BACKGROUND OF THE INVENTION

1. Field of the Invention

The invention relates to voltage limiters and, more specifically, to a sintering process for increasing the high temperature stability of varistors.

2. Summary Of The Prior Art

The prior art provides a wide variety of non-linear resistor devices, typically referred to as varistors. Varistors are formed by sintering a powder which typically includes zinc oxide in combination with other oxides (collectively referred to as the mixture) to form a varistor disc. Leads are attached to the disc permitting the varistor to be connected across a voltage source. Suitable packaging is provided to protect the varistor disc. The electrical characteristics of a varistor are primarily determined by the mixture, the processing of the mixture prior to sintering, and the sintering process.

The present state of the art is such that ZnO varistors will "run away" if the temperature exceeds approximately 180° C. Many applications make it desirable to operate the varistors in excess of this temperature. It is believed that the characteristic V-I curve of a varistor is a result of the defect structure at the grain boundary of the ceramic body which is brought about by the addition of certain selective additives to the ZnO matrix.

The varistor ceramic is obtained as a result of blending these additives with the ZnO to form the mixture, pressing selected quantities of the mixture to form the discs and sintering the disc at an elevated temperature between 1000° and 1400° C. for a period of 1 to 20 hours in an atmosphere of oxygen. This sintering operation allows the formation of several distinct chemical phases within the ceramic body as well as segregation of the additives into well defined compounds. A chemical equilibrium is set up at the sintering temperature which minimizes the free energy of the materials comprising the mixture. On cooling, a non-equilibrium condition arises due to many reasons including the fact that chemical solubilities are temperature dependent, and diffusional forces become diminished to the point that mobilities of the atoms are unable to keep up with the equilibrium conditions associated with the lower temperature. This can result in a non-equilibrium condition becoming frozen in. When the disc is placed in service and the temperature increases, atoms associated with these non-equilibrium conditions migrate, resulting in an irreversible increase in the current which will lead to failure of the varistor.

As a result of the conditions discussed above, the expected life of a varistor dramatically decreases as the operating temperature of a varistor increases. For example, the irreversible resistive current of a typical varistor at a constant voltage stress (voltage applied across the varistor disc) may double in one hour at an operating temperature of 250° C.

A review of the prior art clearly indicates that there is no presently recognized unified scientific theory which is applicable to predict accurately the performance of a varistor made using a particular mixture, or the effect on the characteristics of the varistor disc of the process used for making the disc. Small changes in the mixture or the sintering process can result in dramatic changes in the characteristics of the varistor. The inability to accurately predict the performance of a specific varistor without experimentation is believed to be due, in a large part, to the complex chemistry of the sintering process, discussed above. This being the case, it is necessary to select by experimentation the mixture and the process used for making the varistor disc having preselected characteristics.

Typically in manufacturing varistor discs, the mixture is sintered and, optionally, subjected to various heat treatments. For purposes of this patent application the sintering cycle and subsequent heat treatments are referred to as the "Disc Formation Process".

In designing varistors for particular applications an iterative procedure is used to select the mixture and disc formation process to produce varistors having characteristics suitable for a specific range of applications. This procedure consists of selecting a mixture based on prior experience, selecting a disc formation process based on prior experience, verifying and experimentally adjusting both the mixture and disc formation process to produce a varistor having the desired characteristics. This is the iterative procedure used in developing the disclosed invention.

SUMMARY OF THE INVENTION

The invention comprises an improved disc formation process for making varistor discs. The constituents used to form the varistor disc are ground and mixed, as is conventional in the art, to form the mixture. The mixture is sintered in a furnace at a preselected temperature for a preselected time; the sintering furnace and the disc are cooled to a preselected temperature at a preselected linear rate. The linear cooling rate is selected depending on the mixture and the desired parameters for the varistor.

The process which is the subject matter of this patent application is believed to improve the performance of a varistor disc by reducing the non-equilibrium conditions associated with the components of the mixture which become "frozen-in" during the sintering process. The temperature at which a specific defect structure reaches an equilibrium condition depends on the specific defect structure. Further reductions in temperature below that value at which a specific defect structure has become "frozen-in" will not affect this structure.

For most mixtures currently used in varistors the defect structures become "frozen-in" between the sintering temperature and about 700° C. That being the case, it is not believed necessary to control the cooling rate of the sintered varistor below a temperature of about 700° C. It is also believed that the best results, considering the increased cost due to increasing the time associated with the sintering process, will be achieved with linear cooling rates in the range of 30° to 60° C. per hour. With changes in mixtures, this critical range may change. However, it is believed that the principal of controlling the cooling rate such that non-equilibrium conditions in the finished disc are reduced is applicable to all varistor mixtures.

In evaluating the process comprising the disclosed invention varistor discs were constructed in accordance with conventional practice and in accordance with the process comprising the invention. Each of the varistors were subjected to an ambient temperature in the range of 250° C. at a voltage equal to $0.7E_((0.5)}$. The time interval required for the resistive current to increase to 5 ma/cm$^2$ was measured. This time interval is termed "High Temperature Stability Interval." It is recognized in the art that an increase in the "High Temperature Stability Interval" is a measure of the stability of the varistor under high energy absorption conditions.

DETAILED DESCRIPTION

The ability of a varistor disc to absorb energy is the basis for all commercial varistor designs. Typically a varistor is continuously energized by connecting the two terminals of the varistor to the terminals of a voltage source. This places the varistor in parallel with the power input terminals of electrical equipment coupled to the voltage source.

A small leakage current always flows through the varistor. As the applied voltage increases due to voltage surges, the varistor current increases at a very high rate. As the current through the varistor increases, sufficient power is absorbed to limit the surge voltage, thus providing voltage surge protection for electrical equipment connected to the voltage source. Since the operation of the varistor depends on energy absorption, it is desirable that the energy absorbed per unit volume of the varistor disc be the highest practical value. However, as the rate of absorption increases the temperature of the varistor increases. As is well known in the art, an increase in the temperature of the varistor disc causes an increase in current. This condition can result in catastrophic thermal run-away. For this reason the high temperature stability is the most important factor in determining the useful life of a varistor.

Figure 1:
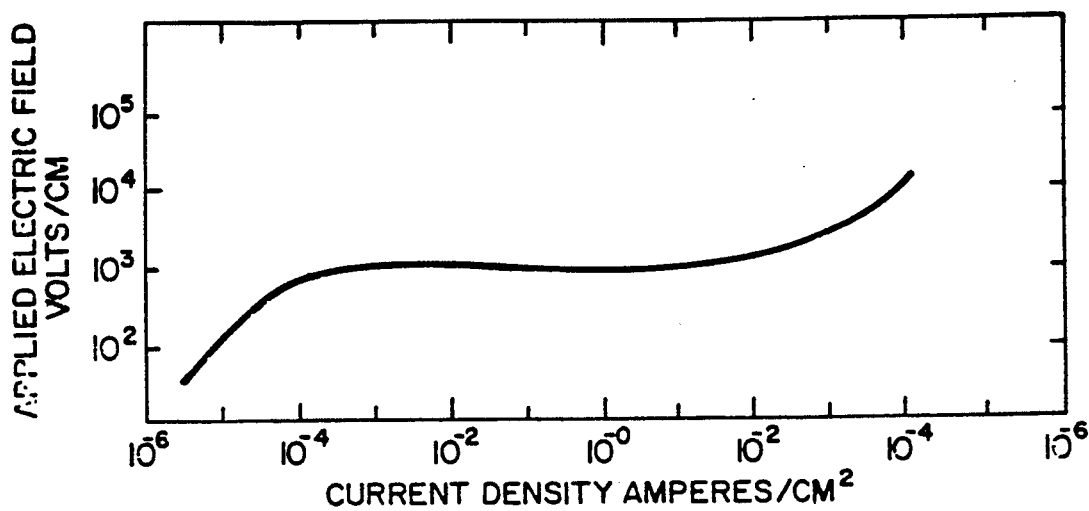
FIG. 1 is a curve illustrating the current density versus the applied voltage of a typical varistor disc.

The electrical behavior of a typical varistor disc at normal operating temperature is illustrated by the curve in FIG. 1, which shows the relationship between the voltage stress of a varistor disc and the current density in amperes/cm$^2$. This curve includes a substantially flat central portion corresponding to a current density in the range of $1 \times 10^{-4}$ to $1 \times 10^2$ amperes per square centimeter. Normally the varistor is operated near the lower edge of this range, typically in the region of $0.5 \times 10^{-3}$ amperes per square centimeter. For convenience the voltage at which a particular resistive current flows is designated as $E_{x.x}$ where E is the voltage and x.x is the associated resistive current.

At elevated temperatures, in the range of 250° C. for example, the current of a varistor at a constant voltage stress irreversibly continues to increase as a function of time. Typically, new mixtures and processes for making varistor discs are verified by constructing a varistor, applying normal operating voltage to the varistor and operating the varistor at 115° C. degrees Centigrade to determine its stability in the absence of voltage surges.

However, high pulsed energy absorption is required to control expected voltage surges. High energy absorption necessary to control voltage surges can be expected to cause the temperature of the varistor disc to increase substantially higher than 115° C. Varistor discs are frequently tested with a constant voltage stress, usually higher than the normal operating voltage stress, at a temperature of 250° C. to determine their susceptibility to detrimental changes in characteristics during periods of high energy absorption. Energy absorption during high voltage surges may be as high as 1000 J/cc.

Figure 2:
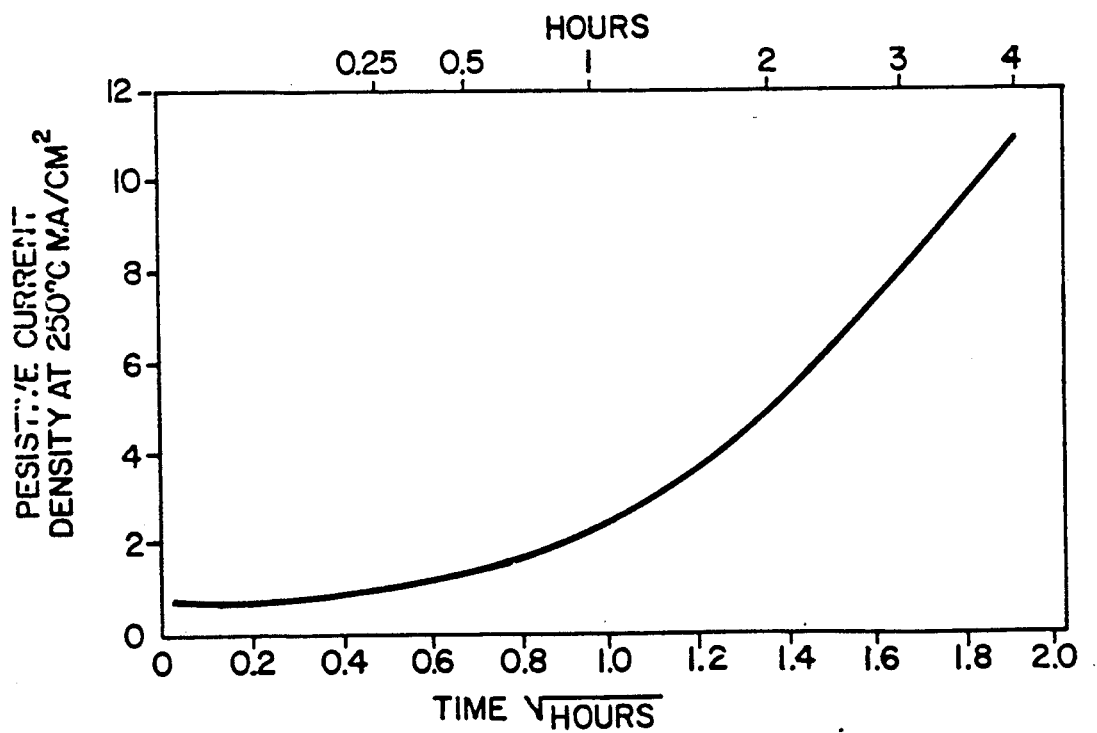
FIG. 2 is a curve illustrating the increase in the resistive current of a typical varistor disc as a function of time at a temperature of 250° C.

FIG. 2 is a curve typically illustrating the irreversible increase (i.e. does not decrease when the temperature is decreased) in current through a varistor as a function of time at a temperature of 250° C. with a constant voltage stress in the range of $0.7E_{0.5}$. This curve clearly indicates that if the temperature is in the range of 250° C., the resistive current irreversibly increases very rapidly as a function of time. (Resistive current is the current which flows through the varistor at a particular operating voltage.) As is well known in the art and as demonstrated by this curve, it is absolutely necessary to control the increase in resistive current of the varistor in order to reduce the heating in the varistor to prevent thermal run-away and catastrophic failure. Considerable effort is presently being devoted to reducing the rate of this irreversible increase in resistive current because this parameter determines the useful life of the varistor.

The disclosed invention provides an improved process for making varistor disc having high energy absorption per unit volume coupled with a low rate of increase in the irreversible resistive current at high temperature. That is, varistors constructed in accordance with the invention exhibit high energy absorption and an improved High Temperature Stability Interval.

It is recognized in the art that the energy absorption of a typical varistor is directly proportional to the grain size of the zinc oxide within the disc. It is also well known that the grain structure of the zinc oxide can be altered by the chemical composition (mixture) of the varistor disc and the sintering cycle utilized in constructing the varistor disc. Typical prior art processes for improving the high temperature stability reduced the energy absorption.

In utilizing changes in the chemical composition (mixture) to improve the high temperature stability, it is also known that the other characteristics of the varistor are also affected, with many of these effects being adverse. Specifically, as the grain structure is altered to improve the high temperature stability, the energy absorption is adversely changed (decreased). By contrast, the sintering cycle which is the subject matter of this patent application improves the high temperature stability without significant adverse changes in the energy absorption of the varistor disc.

The chemistry associated with the sintering process is not well understood. However, as subsequently discussed, the improvements associated with the sintering cycle which is the subject matter of this patent application have been demonstrated to be applicable to a variety of mixtures.

The process which is the subject matter of this patent application has been tested using a variety of mixtures formed into discs and sintered at a temperature in the range of 1100° to 1300° C. for a time interval suitable for the mixture. The sintering furnace is then cooled down at a linear rate in the range of 30° to 60° C. per hour.

Figure 3:
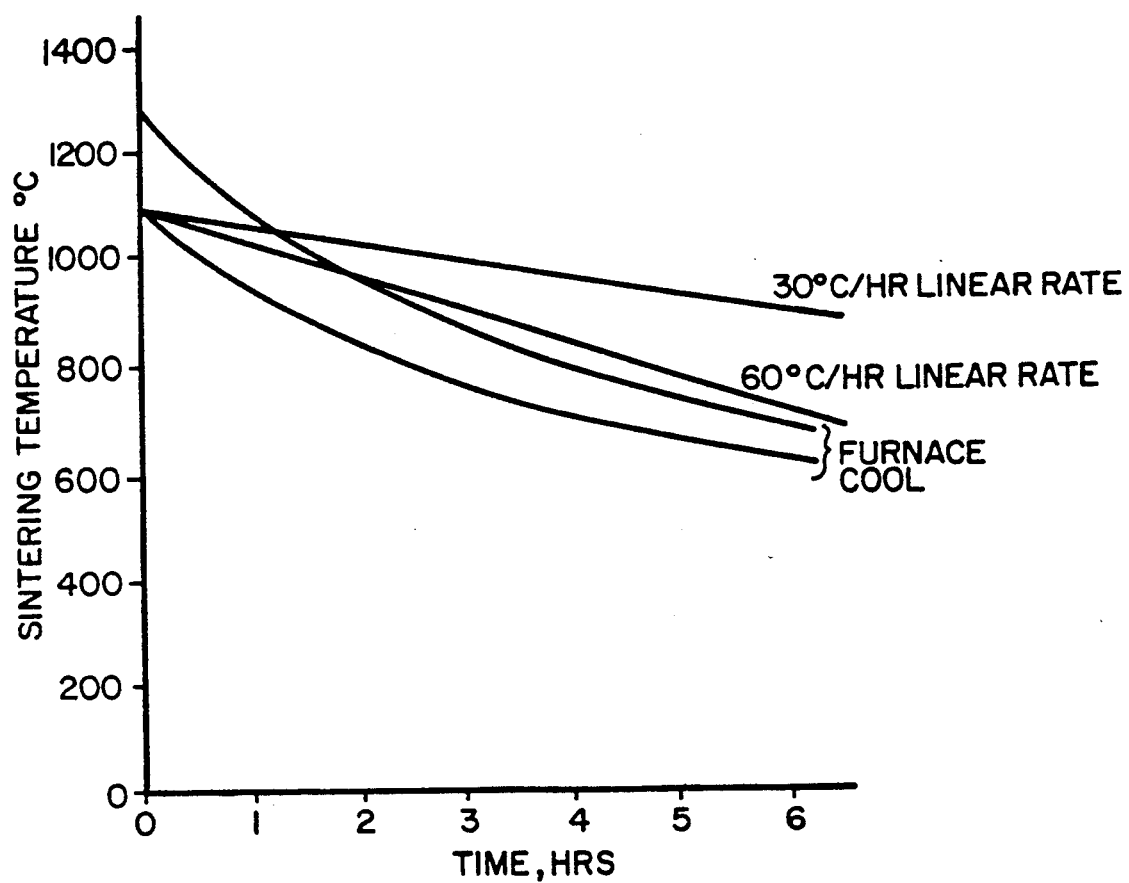
FIG. 3 is a series of curves illustrating normal sintering furnace cool-down rates and furnace cool-down rates in accordance with the invention.

Based on the above testing, it is believed that the lower the rate of cooling of the sintering furnace the more the performance of the varistor is improved. However, a point of diminishing returns is reached in that the improvements associated with a further reduction of the cooling rate are not justified by the increased processing time. For most varistor mixtures it is believed that the most beneficial results will be obtained using a cooling rate in the range of 60° to 30° C. per hour. The range of linear cooling rates applicable to the invention are compared to typical uncontrolled cooling rates for the sintering furnace used in the experiments in FIG. 3.

The following specific examples demonstrate that the improved process is applicable to a variety of typical varistor mixtures. Varistors were formed of four different mixtures. Each of the mixtures included $Bi_2O_3$, $Co_3O_4$, $MnO_2$, $Sb_2O_3$, $SiO_2$ and low levels of Al, B and K in differing ratios. The results are compared below.

Varistor discs of three differing compositions, discussed above, were made in accordance with conventional processes and in accordance with the process which is the subject matter of this invention. The high temperature stability interval and the other electrical parameters of each of these varistor discs was measured. In the first sample the high temperature stability interval of the varistor constructed in accordance with conventional practice was 63 minutes as compared to 350 minutes for the varistor constructed in accordance with the invention. In the second sample the high temperature stability interval increased from 70 to 317 minutes. In the third sample the high temperature stability interval increased from 15 to 350 minutes. The above discussed increases in the high temperature stability interval were achieved without significant determinable changes in the other electrical parameters of the varistor. These tests also demonstrate that the process is generic in that it is applicable to a wide variety of varistor mixtures.

We claim:

1. A method for making a varistor disc with increased high temperature stability comprising the steps of:
   (a) formulating and preparing a sinterable mixture containing zinc oxide for said varistor disc;
   (b) compacting said mixture to form said disc;
   (c) sintering said disc at a first preselected temperature of at least 1100° C.; and
   (d) cooling said disc from said first preselected temperature to a temperature in the range of 700° C. at a predetermined linear rate; wherein said predetermined linear rate and said first preselected temperature are selected to reduce non equilibrium conditions which become "frozen-in" as said disc is cooled.

2. A method for making a varistor disc in accordance with claim 1 wherein said first preselected temperature is in the range of 1100° C. to 1300° C.

3. A method for making a varistor disc in accordance with claim 2 wherein said linear rate is in the range of 30° C. to 60° C. per hour.

4. A method for making a varistor in accordance with claim 1 wherein said linear rate is between 30° and 60° C. per hour.

* * * * *